Nov. 19, 1940. KARL-GEORG HOLSTEN ET AL 2,221,946
RADIO GONIOMETER
Filed June 14, 1939
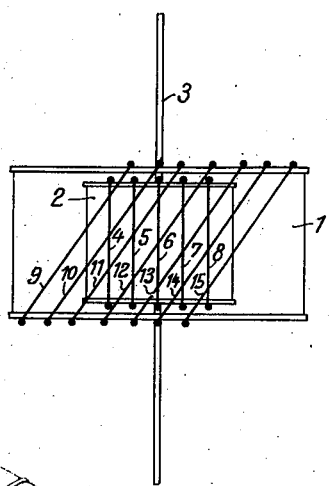
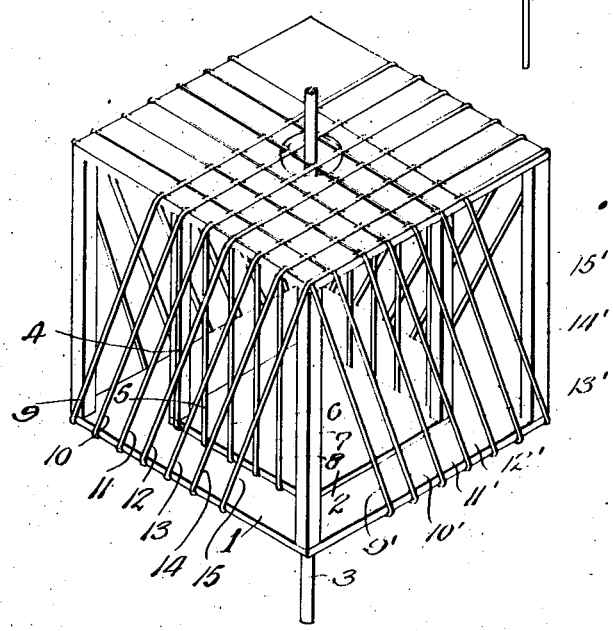
Inventors:
Karl-Georg Holsten
Walter Schätzel
by
Attorney.

Patented Nov. 19, 1940

2,221,946

UNITED STATES PATENT OFFICE 2,221,946

RADIO GONIOMETER

Karl-Georg Holsten and Walter Schätzel, Berlin, Germany, assignors to C. Lorenz Aktiengesellschaft, Berlin-Tempelhof, Lorenzweg, Germany, a company Application June 14, 1939, Serial No. 279,010
In Germany June 22, 1938

1 Claim.  (Cl. 250—11)

This invention relates to radio goniometers, and more particularly to new and useful structural designs for such devices.

Radio goniometers adapted for use in radio direction finding receivers for ascertaining the sense of direction of incoming electromagnetic waves generally comprise two perpendicularly related field coils and a search coil rotatably disposed in the electromagnetic field of the two field coils. Certain difficulties have heretofore been encountered with respect to the application of the individual turns of the various coils, specifically when the goniometer is adapted to receive very short and ultra short waves because of the fact that these turns must be so arranged as to involve a high degree of coupling between the field coils and the search coil and, moreover, for the purpose of eliminating direction finding errors to insure that the rate of coupling is caused to vary in accordance with a pure sine law in response to a rotation of the search coil relative to the field coils. Experience teaches that it is very difficult to concurrently satisfy these two requirements in the above mentioned ultra short range of waves since the corresponding high frequency oscillations demand field coils and search coils comprising a comparatively low number of turns which for electrical and mechanical reasons must be widely spaced apart from one another. These widely spaced turns introduce a further drawback, namely, that the rate of coupling becomes subject to sudden and uncontrollable changes when the winding planes of the search coil in response to a rotation thereof move from one winding plane to the neighbouring winding plane of the field coils. Such a goniometer device does not induce a sine-shaped characteristic and due to the suddent leaps thereof is not useful for accurately determining the sense of direction of a signalling station.

It is the object of this invention to so dispose the field coils and/or the search coil of a radio goniometer as to obtain the desirable uniform characteristic of the rate of coupling between the two types of coils in response to a movement of the search coil relative to the field coils. This is realized in accordance with the main feature of this invention by obliquely disposing the turns of one type of coils relative to those of the other type of coils.

The oblique relationship between the individual turns and, hence, winding planes of the stationary coils and those of the movable coil may be obtained in a variety of ways as will hereinafter be fully explained.

The accompanying drawing schematically shows one embodiment of our invention in which Fig. 1 diagrammatically shows one field winding and the search coil in elevation, and Fig. 2 is a perspective view more completely showing the winding arrangement.

Reference numeral 1 indicates a supporting body carrying one of the field coils of a radio goniometer while reference numeral 2 denotes a supporting body for the search coil thereof. The body 2 is fixedly attached to a pivotally mounted spindle 3 and rotatable therewith. The individual turns 5, 4, 6, 7 and 8 of the search coil embodied are by way of an example helically wound onto the supporting body 2 in the usual manner, that is, substantially parallel with the spindle 3, by neglecting the slight departure from this parallelism on account of the pitch of such helix. Now, according to the invention, the turns 9, 10, 11, 12, 13, 14 and 15 of the field coils shown are applied on the supporting member 1 obliquely with respect to the turns of the search coil. This arrangement involves the essential feature that the rate of coupling between the two coils is gradually changed with a movement of the search coil relatively to the field coil so that the characteristic of coupling is caused to change in accordance with any desired predetermined law since no leaps or sudden uncontrollable changes are set up as heretofore when the winding plane or planes of the search coil are moved from one to the other of the substantially parallel neighbouring winding planes of the field coil.

The second field coil of the radio goniometer which has been omitted in Fig. 1 for more closely pointing out the nature of our invention may be designed from the same viewpoints and be applied in any suitable manner, preferably with its turns 9'-15' perpendicularly related to those of the first mentioned field coil as shown in Fig. 2.

The same beneficial result will be obtained if the field coil or coils are so arranged on the supporting body or bodies that their turns are substantially in parallel with the rotatable spindle of the search coil, while the turns of the last mentioned coil are disposed obliquely with respect to those of the field coil or coils.

It is likewise possible without departing from the scope of this invention to so arrange the turns of the field coils and the search coil that none of the turns present parallelism with the rotatable spindle of the search coil, that is, to place them on their respective supporting bodies in such manner that the winding planes form an angle therewith other than 90 degrees.

In addition to the beneficial properties of a radio goniometer as constructed in accordance with this invention, the further feature of high degree of coupling between the field coils and the search coil is obtained by virtue of the fact that the slantly disposed windings are capable of covering larger surfaces than the windings which are perpendicularly applied on their respective supporting bodies.

What is claimed is:

A radio goniometer coil assembly comprising, a hollow supporting body, a field coil formed by a number of substantially parallel wire turns disposed on the said body, a further supporting body positioned within the said first mentioned body, a rotatable search coil formed by a number of wire turns applied substantially in parallel with each other on the said further body and obliquely with respect to the first mentioned parallel turns in all positions of rotation of said search coil, and a rotatable spindle fixedly attached to the said search coil supporting body for angularly rotating the said search coil relative to the said field coil.

KARL-GEORG HOLSTEN.
WALTER SCHÄTZEL.